H. W. KARDELL.
TRACTOR.
APPLICATION FILED JUNE 25, 1914.
1,153,692.
Patented Sept. 14, 1915.
2 SHEETS—SHEET 2.
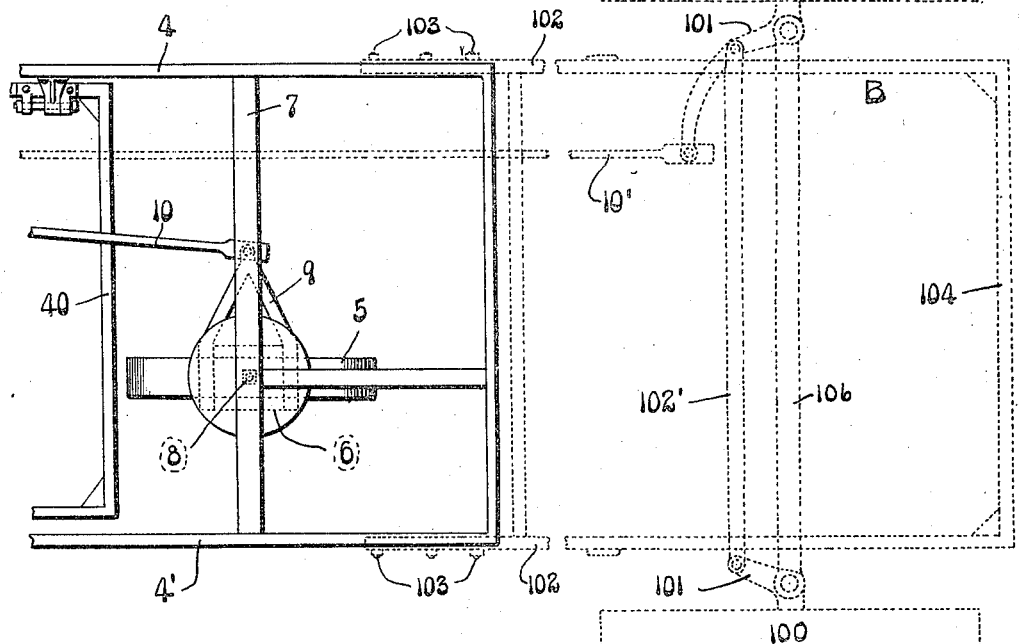
Fig. II.
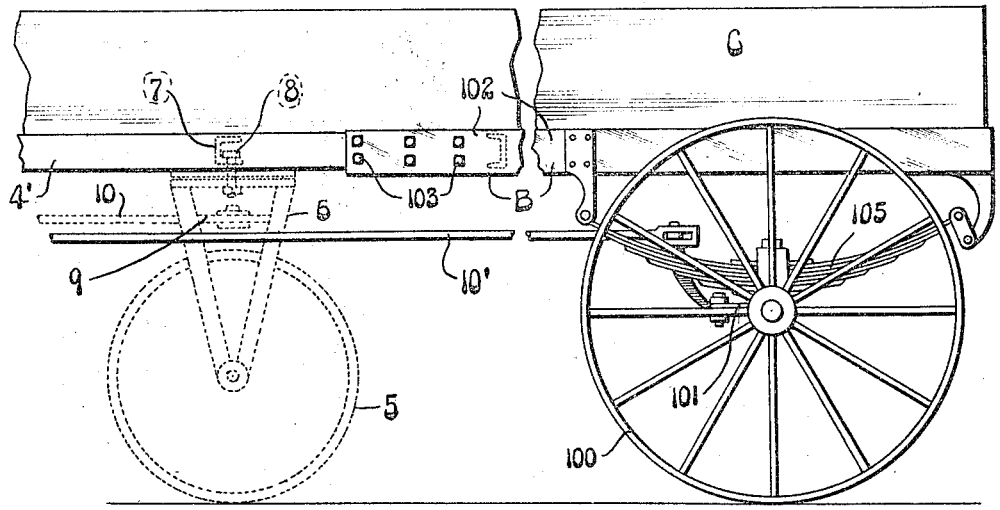
Fig. III.
Attest
A. J. McCauley
E. B. Linn
Inventor:
H. W. Kardell
by Knight & Cook
Att'ys.

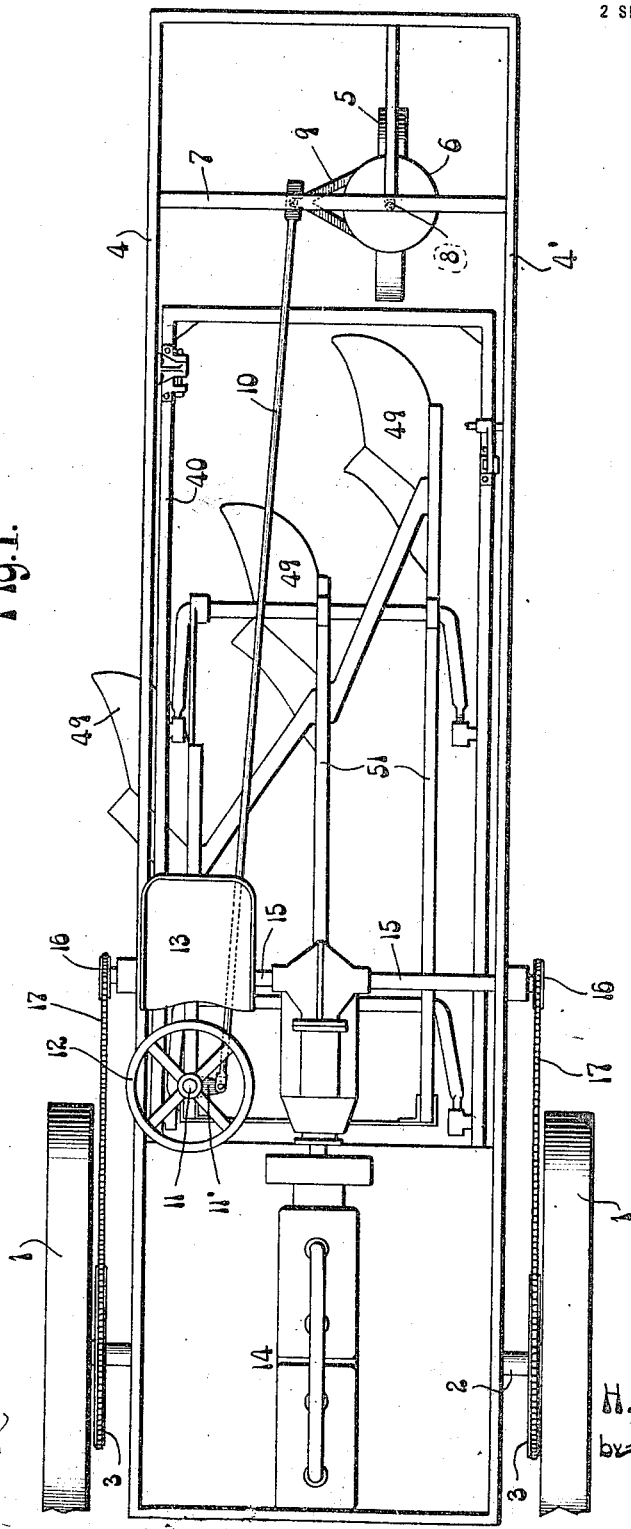

UNITED STATES PATENT OFFICE.

HENRY W. KARDELL, OF ST. LOUIS, MISSOURI.

TRACTOR.

1,153,692. Specification of Letters Patent. Patented Sept. 14, 1915.

Original application filed May 23, 1913, Serial No. 769,356. Divided and this application filed June 25, 1914. Serial No. 847,347.

*To all whom it may concern:*

Be it known that I, HENRY W. KARDELL, a citizen of the United States of America, and a resident of the city of St. Louis and State of Missouri, have invented certain new and useful Improvements in Tractors, of which the following is a full, clear, and exact description, reference being had to the accompanying drawings, forming a part of this specification.

My invention relates to a convertible tractor, the object being to produce a machine of this kind which may be used as a tractor, more particularly as a traction plow, and which may be readily converted into a motor truck for carrying farm produce, merchandise, or the like.

In accordance with my invention, the tractor is provided with a detachable ground wheel, or ground wheels, and the tractor body is adapted to receive a wheeled attachment which preferably extends from the tractor body so as to form a continuation thereof.

This application is a division of an application for patent filed by me May 23, 1913, Serial No. 769,356, tractors.

Figure I is a top or plan view of a tractor embodying the features of my invention. Fig. II is a top or plan view of the rear portion of the tractor, the attachment being shown in dotted lines. Fig. III is a side elevation of the parts shown in Fig. II, the attachment being shown in full lines and the single steering wheel being shown in dotted lines.

The tractor comprises a pair of front ground wheels 1 secured to the axle 2, the ground wheels being supplied with suitable means such as sprocket wheels 3 to which power is transmitted to impart rotation to the said ground wheels from the engine of the tractor, as will hereinafter more fully appear. The tractor frame comprises longitudinal side sills 4 and 4' extending from front to rear of the frame, and also comprises suitable cross members uniting said sills at the front and rear ends and intermediate of their ends. The tractor frame is supported at its rear end, when the tractor is utilized as a draft medium for a plow by a steering wheel 5, the axle of said steering wheel being journaled in an inverted U-shaped fifth wheel member 6 that is rotatably secured to the cross bar 7 of the tractor frame by a king bolt 8. The fifth wheel member 6 is also provided with a laterally projecting arm 9 to which the connecting rod 10 of the tractor steering mechanism is pivoted. The connecting rod 10 extends forwardly from the location of the steering wheel 5 to a crank 11' operable by a steering shaft 11 to which the crank is geared in any suitable manner. The steering shaft 11 is provided with a hand wheel 12, by which said shaft may be rotated to impart longitudinal movement to connecting rod 10 for the purpose of causing the steering wheel 5 to direct the course of the tractor when it is propelled on the ground. Adjacent to the steering shaft 11 is a driver's seat 13 that is mounted on the tractor frame in any suitable manner.

14 designates an engine or motor of any suitable description carried by the tractor frame to supply the necessary power for operating the tractor.

15 designates a jack shaft operable by the engine 14, said jack shaft being provided with sprocket wheels 16 that receive endless drive chains 17 operable on the sprocket wheels 3.

Plows 49 are fixed to plow beams 51 carried by a plow frame 40, said plow frame being detachably secured to the tractor frame in any suitable manner. When the traction plow is in service one of the front wheels 1 and the rear wheel 5 run in furrows while the other ground wheel 1 rides over unplowed ground.

When it is desired to utilize the tractor as an ordinary motor truck, the plow frame and the single steering wheel 5 are removed and a wheeled attachment B is secured to the rear end of the tractor body, as shown in dotted lines, Fig. 2 and in full lines Fig. 3. This produces a truck having a long wheel base, and a suitable truck bed C may be mounted on the tractor and its attachment. The attachment comprises ground wheels 100 secured to steering knuckles 101, a connecting bar 102' uniting the steering knuckles, and a steering rod 10' secured to one of the steering knuckles, the steering rod being operable by the steering device previously described. The attachment frame consists of short side sills or sub-sills 102 adapted to be secured to the side sills of the body of the tractor by means of bolts 103, and an end sill 104 connecting the short side sills 102. The short side sills 102 extend rearwardly from the rear of the tractor so as to form a continuation of the main side sills 4 and 4', thereby elongating the tractor body. Springs 105 are preferably arranged between the attachment frame and the axle 106.

I claim:—

1. A traction plow comprising traction wheels, a tractor frame adapted to receive a single steering wheel, and a steering device for operating said single steering wheel, combined with an attachment extending rearwardly from the rear of said tractor frame, the said attachment comprising an extension frame detachably secured to the tractor frame and forming a continuation thereof, and a pair of steering wheels supporting said extension frame, the last named steering wheels being operable by said steering device.

2. A traction plow comprising a main tractor frame, traction wheels and a ground wheel supporting said main tractor frame, said ground wheel being detachably secured to said main tractor frame, combined with an attachment adapted to be substituted for said ground wheel, said attachment comprising an extension frame adapted to form a continuation of said main tractor frame, means for detachably securing said extension frame to said main tractor frame, and a pair of ground wheels supporting said extension frame and adapted to coöperate with said traction wheels to support said main tractor frame.

3. A convertible tractor having a main frame, drive wheels, a ground wheel detachably secured to said main frame, and a steering device for operating said ground wheel, said steering device being detachably secured to said ground wheel; combined with an attachment adapted to be substituted for said ground wheel and adapted to extend from an end of said main frame, said attachment comprising an extension frame adapted to form a continuation of said main frame, means for detachably securing said extension frame to said main frame, a pair of ground wheels supporting said extension frame, and means for attaching said steering device to the last mentioned ground wheels.

4. A convertible tractor comprising a main tractor frame having side sills, traction wheels and a ground wheel supporting said main tractor frame, said ground wheel being detachably secured to said main tractor frame; combined with an attachment adapted to be substituted for said ground wheel, said attachment comprising an extension frame having side sills adapted to form continuation of the side sills of said main tractor frame, and a pair of ground wheels supporting said extension frame and adapted to coöperate with said traction wheels to support said main frame.

HENRY W. KARDELL.

In the presence of—
M. M. APGAR,
A. J. McCAULEY.